United States Patent

Laws et al.

Patent Number: 5,960,663
Date of Patent: Oct. 5, 1999

[54] METHOD AND MEANS OF TEMPERATURE CONTROL

[75] Inventors: William Robert Laws, Dorking; Geoffrey Ronald Reed, Kingswood, both of United Kingdom

[73] Assignee: Encomech Engineering Services Ltd, Epsom, United Kingdom

[21] Appl. No.: 09/012,770

[22] Filed: Jan. 26, 1998

[30] Foreign Application Priority Data

Jan. 28, 1997 [GB] United Kingdom ............... 9701711

[51] Int. Cl.$^6$ ...................................... B21B 27/06
[52] U.S. Cl. ............................... 72/202; 72/200
[58] Field of Search ................... 72/16.5, 13.5, 72/18.3, 20.2, 19.1, 202, 200, 342.1, 342.5, 342.6, 342.94

[56] References Cited

U.S. PATENT DOCUMENTS

| | | |
|---|---|---|
| 3,344,648 | 10/1967 | Gray . |
| 4,343,168 | 8/1982 | Laws et al. . |
| 4,452,587 | 6/1984 | Laws et al. . |
| 4,463,585 | 8/1984 | Laws et al. . |
| 4,499,746 | 2/1985 | Laws et al. . |
| 4,736,608 | 4/1988 | Laws et al. . |
| 5,711,175 | 1/1998 | Laws et al. . |

FOREIGN PATENT DOCUMENTS

| | | |
|---|---|---|
| 887953 | 12/1971 | Canada . |
| 889615 | 1/1972 | Canada . |
| 0330293A2 | of 0000 | European Pat. Off. . |
| 0677337A2 | of 0000 | European Pat. Off. . |
| 0 005 340 | 11/1979 | European Pat. Off. . |
| 0 059 093 | 9/1982 | European Pat. Off. . |
| 2708783 | of 0000 | Germany . |

OTHER PUBLICATIONS

Patent Abstract of Japan, vol. 007, No. 193 Aug. 24, 1983 JP 58 093510A.

Brochure: "DAVY and ENCOMECH have combined two recent plant innovations to provide a major advance in hot strip rolling", Steel Times, Sep. 1990.

Article: "The relative benefits of Passive and Active HSM Transfer Table Heat Insulation Systems", Steel Times, Jun. 1996.

*Primary Examiner*—Joseph J. Hail, III
*Assistant Examiner*—Rodney Butler
*Attorney, Agent, or Firm*—Larson & Taylor

[57] ABSTRACT

An apparatus and a method for controlling the lateral temperature control of hot material on a roller table of a hot roller mill employs adjustable heat-insulating panels below the hot material path, between the rollers of the roller table. Between each successive pair of rollers a number of the heat-insulating panels are arranged side by side, as a group spanning the width of the table. At least away from the entry end of the table, the panels of each group can be displaced selectively to allow a greater loss of heat from a central region of the hot material between its side edges than in the side edge regions themselves. The selective displacement of the panels can be preprogrammed to be determined by the characteristics of the hot material entering the roller table.

20 Claims, 5 Drawing Sheets

METHOD AND MEANS OF TEMPERATURE CONTROL

BACKGROUND OF THE INVENTION

This invention relates to roller table heat shields for metal hot rolling mills.

In the hot rolling of steel in slab form, when a transfer bar passes along a roller table between roughing mill and finishing mill, a typical journey time might be about 130 seconds. In the absence of any means to reduce heat loss the temperature of the bar drops during this period. A thin transfer bar (up to about 25 mm thick) undergoes an edge temperature loss similar to the temperature loss at the centre of its width. However, with thicker transfer bars (about 40 mm or more thick) the edge of the material undergoes a greater temperature loss than the centre of the width because a significant amount of heat is being radiated from the side edge in addition to radiation from the top and bottom surfaces. The edge temperature loss can be so great as to affect significantly the metallurgical properties and edge cracking can occur during finish rolling.

Because of this problem it is known to install induction edge heaters to reheat the edges of transfer bars prior to entry to the finishing mill. However, this is wasteful: the power input required can be as much as 5 MW. Moreover, because the width of the transfer bars can vary considerably from one to the next, means have to be provided for moving the edge heaters to position them close to the edges of each bar.

It is also known to provide heat insulating means around the hot material path along a roller table to reduce temperature loss from hot material in slab or strip form, as illustrated in EP 005340, for example. Upper, lower and side heat insulating panels arranged as a closed, high efficiency, heat shield may be able to retain up to 96% of the heat in the hot strip during its passage from the exit of the roughing mill to entry to the finishing mill.

It has proved more difficult, however, to control the lateral temperature profile of the hot material, especially if the rolling mill is arranged to accommodate a wide range of material widths and thicknesses.

In EP 005340, upper heat insulating panels are suspended over the roller table on cantilever supports to allow them to be raised away from the table to avoid damage and to provide access to the table for maintenance. These upper panels are mounted displaceably on their supports, either to slide laterally or to be tiltable, to vary the heat-insulating effect laterally of the roller table. But there is a problem that incorporating such displacement mechanisms for the upper panels significantly increases the inertia of the cantilevered assembly. This entails considerable extra power to ensure that the lifting of the panels can still be performed fast enough to prevent damage from a deformed strip or slab, not to mention the cost penalty of the increased structural support required. It is also proposed in EP 005340 that the bottom panels are laterally slidable but their range of movement is severely limited, in particular by the cantilever support structure and motor drive which must lie close to the side of the roller table.

Another heat shield arrangement proposed in EP 198595 employs displaceable heat shield panels which can be moved with the aim of reducing the clearance between the panels and the hot material. Heat loss from the edges of the material in particular can be reduced to some degree if the side insulating panels can be adjusted close to the material being handled, but this method of control has limited application and is useful primarily for narrower material paths, eg. less than about 800 mm, or where the variation in product width is small.

There therefore remains a need for a cost-effective form of temperature control for hot material on a roller table of a hot-rolling mill that will mitigate the phenomenon of increased edge cooling, especially from relatively thick material, and that can be employed over a wide range of cross-sectional sizes of material.

SUMMARY OF THE INVENTION

According to one aspect of the present invention, a heat shield is provided for a roller table comprising series of upper and lower heat-insulating panels respectively above and below a material travel path along the table, over at least a part of the length of the table the lower panels being arranged in groups between successive rollers of the roller table, a plurality of panels being disposed side by side in each said group to span the width of the table, for at least a plurality of said groups means being provided for displacing some of the panels of each said group relative to the remaining panels of the group by tilting their upper faces away from an operative position relative to the material path, whereby the panels of said groups can be displaced selectively to vary the heat-insulating effect across the width of the roller table.

By the use of such apparatus it is possible to avoid the need for induction edge heaters, or at least reduce significantly the power required for such heaters.

Preferably the displaceable panels are mounted on support means located below the panels in positions in which they are shielded from heat radiation from the hot material path when said panels are tilted relative to said path.

It is preferred to arrange that the upper panels are essentially fixed on their support means which are upwardly displaceable, eg. by pivoting, to move the upper panels away from the hot material path. In this way, a particularly simple arrangement is obtained in which lateral temperature control is achieved without increasing the complexity of the upper panels and their mounting and displacement means.

Control means may be provided for said pivoting of the bottom panels, comprising temperature sensing means responsive to the temperature at different locations across the roller table so that the movement of the bottom panels can be adjusted to the sensed transverse temperature profile over the width of the hot material on the table. Alternatively the panels may be pivoted in accordance with a predetermined program, in dependence on the size and temperature of the material being transferred.

According to another aspect of the invention, there is provided a method of transferring hot material on a roller table of a hot rolling mill in which heat-insulating panels mounted between rollers of the table below a travel path along the table for the hot material, are arranged side by side in groups between each adjacent pair of rollers and at least some of the panels lying in an inner region of at least some of the rows of panels are selectively tilted to allow an increased escape of heat from a central portion of the hot material between its side edges.

By way of example, an embodiment of the present invention will be described with reference to the accompanying drawings.

DESCRIPTION OF THE PREFERRED EMBODIMENTS

Figure 1:
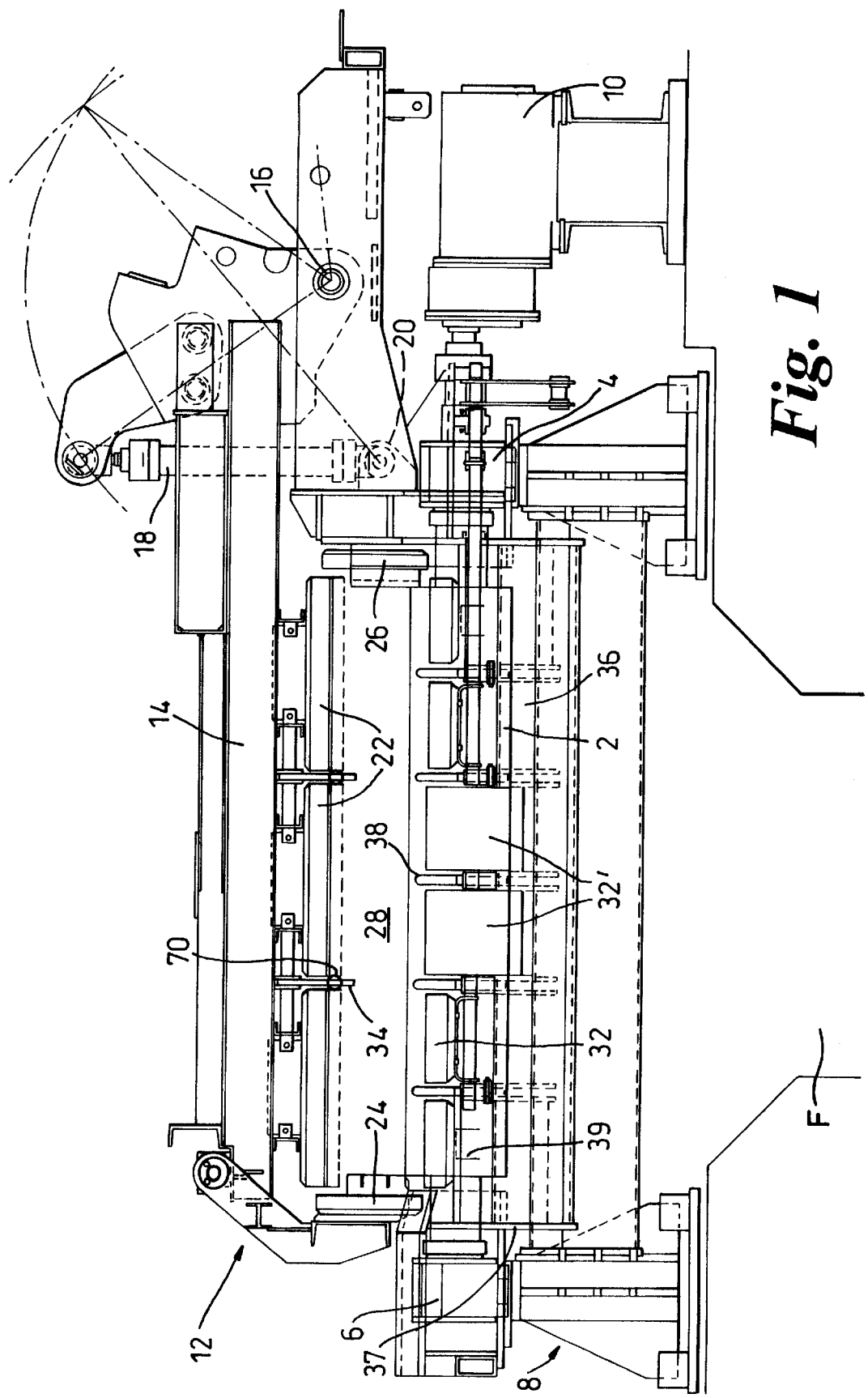
FIG. 1 is a transverse cross-sectional view on the line I—I in FIG. 2 of a transfer roller table according to the invention.

The illustrated roller table comprises a series of parallel rollers 2 mounted in bearings 4,6 on a lower support structure 8 of the table and driven by motors 10. Shown only in FIG. 1 is an upper structure or lid 12 that extends the length of the table in a number of discrete sections each of which comprises a cantilever frame 14 mounted on fixed, coaxial pivots 16 that run parallel to the table. The cantilever frames 14 can be swung upwards from the bottom position shown by means of hydraulic rams 18 connected between each frame 14 and a fixed mounting 20. Top and side insulating panels 22,24 carried on the frames 14, and fixed side insulating panels 26, define, with the rollers 2, a space which provides a travel path 28 for the hot material to be carried along the roller table by the rollers. Lower heat-insulating panels 32 between the rollers enclose the hot material path from below. All the panels 22,24,26,32 are preferably of the re-radiating type described in EP 059093 and have hot faces which when directed towards the material on the roller table, limit the loss of heat by radiation from the material.

The upper panels 22 and the side panels 24 are arranged in laterally extending groups each fixed to a respective cantilever frame 14. These panels 22,24 are essentially fixed in place on their pivotable cantilever frames 14, although they may have some small freedom of movement on their attachments to the arms to accommodate thermal effects. Bumper bars 34 projecting below the upper panels are associated with a sensing mechanism (not shown) for distorted hot material, in order to be able to trigger upward pivoting of the frames 14, so that the panels carried by the frames can be swung clear of the roller table to be protected from damage in the manner described in EP 005340.

The lower panels 32 are supported on transverse beams 36 of a heat shield frame module 37 mounted in the table lower support structure 8. The panels 32 are arranged in groups between each successive pair of rollers 2, each group of panels extending side by side across the width of the table. The illustrated example shows the panels in groups of six panels of similar size and shape. Between successive panels 32 in each group, protective bumper bars 38 (some of which are omitted in FIGS. 3 and 4) project above the panels close to the top level of the rollers 2. Some of the panels 32 are fixed in position and are secured to their beams 36 through brackets 39 (FIG. 1). Others of the panels 32 are movable, independently of the bumper bars 38. For this purpose the movable panels of each group are connected to the beam 36 below the group of panels through rotatable shafts 42 which lie on a common transverse axis and which are coupled to a hydraulic ram or rams (shown at 52 in FIG. 5 only) or other displacement drive means for their rotation.

Figure 3:
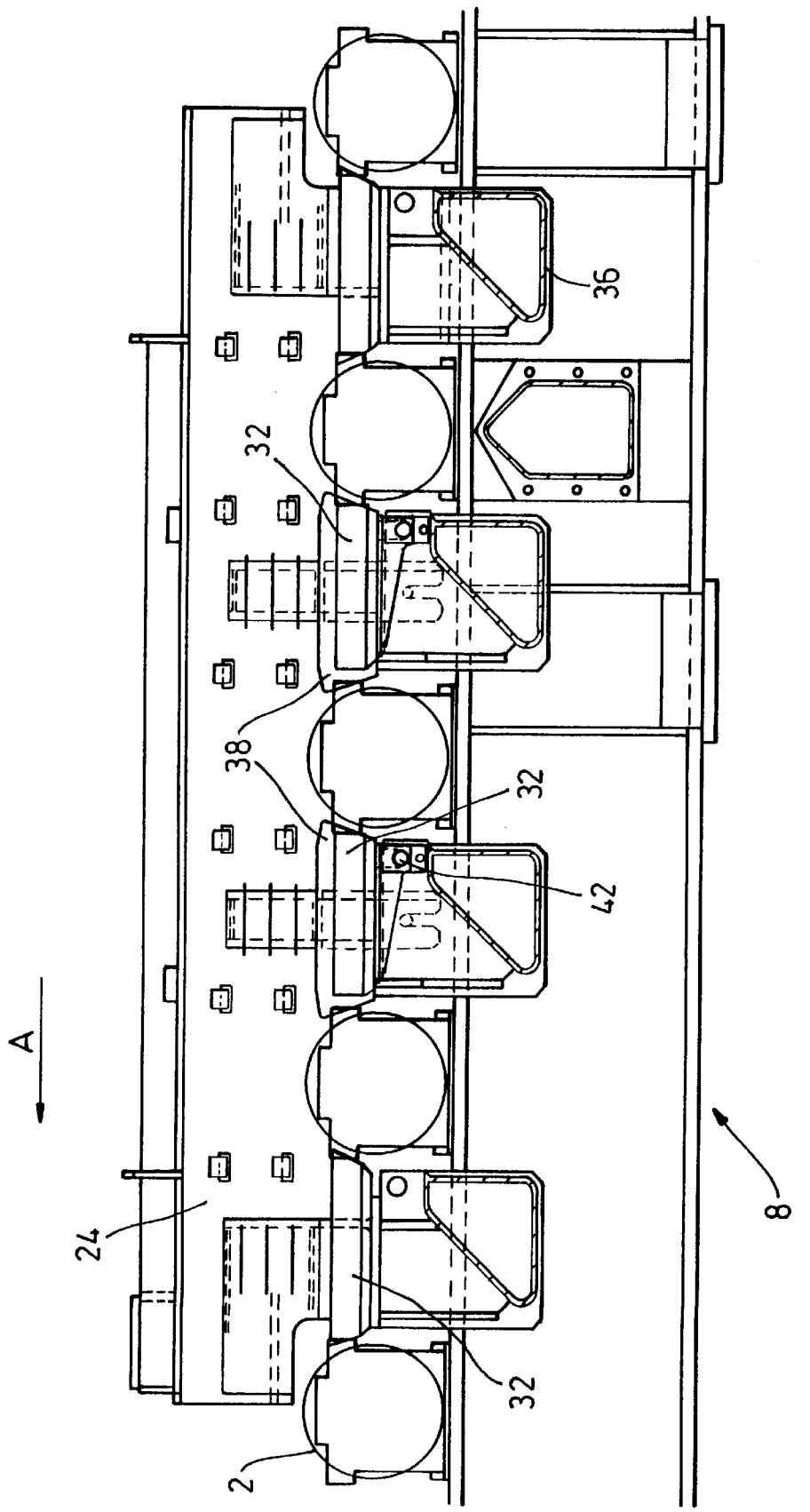
FIG. 3 is a partial longitudinal section of the lower part of the roller table of FIGS. 1 and 2 showing the lower heat-insulating panels in their raised positions.
Figure 4:
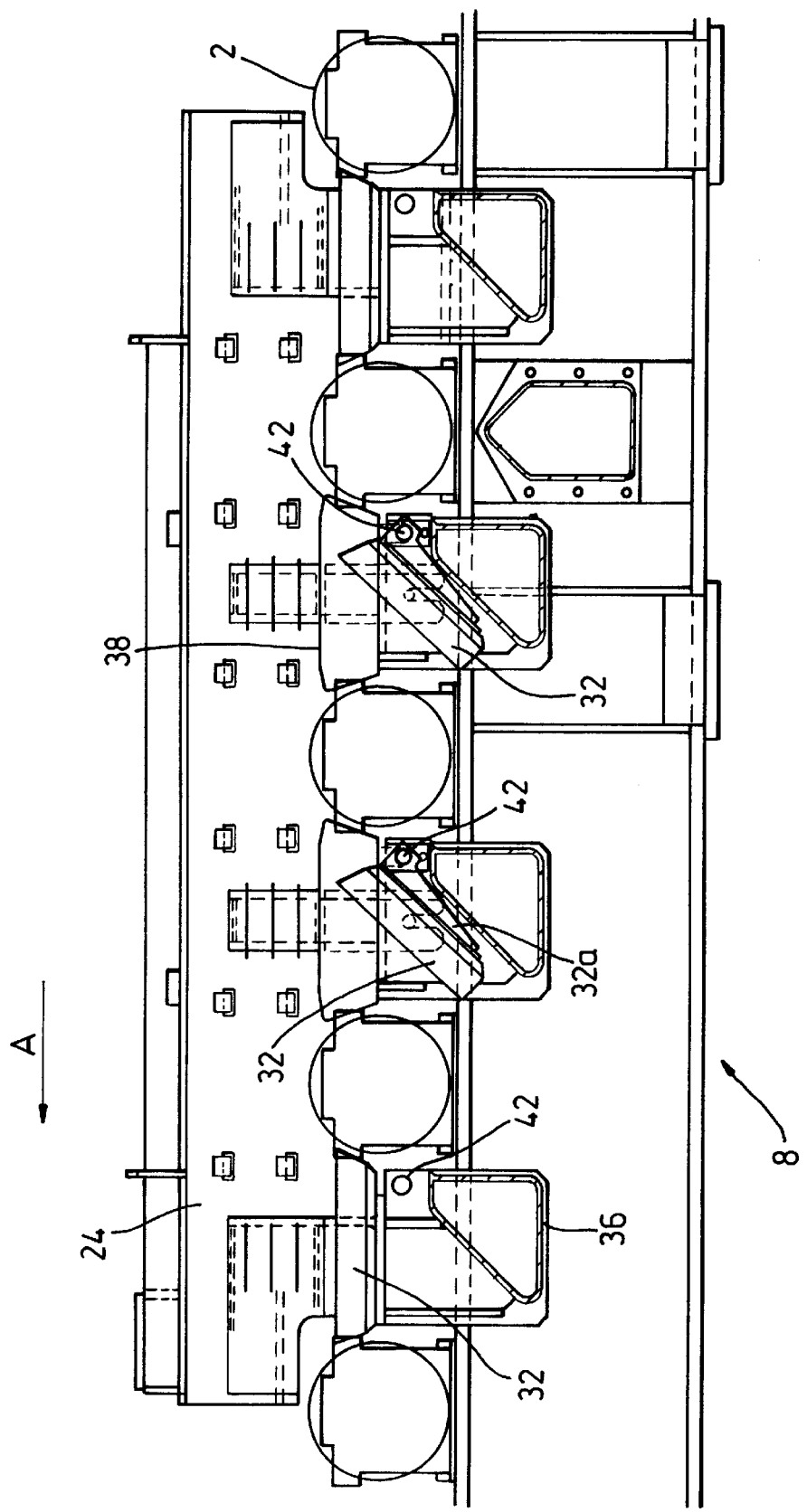
FIG. 4 is a view similar to FIG. 3 showing some of the displaceable lower heat-insulating panels lowered.

By operation of the rams, the movable panels can be swung between the operative position in which they are all shown in FIG. 3, where the top face of each panel is located close and parallel to the hot material path to re-radiate heat to the material above it, and a position shown by the two middle panels in FIG. 4, in which the re-radiating hot face of the panel is tilted downwards from the operative position. In the tilted position the underface of hot material over the panel is exposed and radiates heat downwards below the panels, and more particularly re-radiation of heat back to the material by the panel is prevented or limited.

A feature of the design described is that when the panels are tilted downwards, radiation can pass between the rollers 2 and the panels without impinging on the structure of the roller table frame. In particular, as is apparent from FIG. 4, the beams 36 on which the panels are mounted are shielded by the panels to virtually the same extent whether the panels are horizontal or are tilted downwards.

The angle of tilt of the panels 32 may be varied to vary the degree of heat dissipation. The displacements will, however, usually be performed in a laterally symmetrical manner to affect opposite edges of the hot material similarly. In the example shown, the two outermost panels of each group of bottom panels are fixed in position, the two central panels are displaced together, conveniently by a single ram, and similarly the two intermediate panels that lie between the outer and innermost pairs of panels are displaced together by a common drive.

Figure 2:
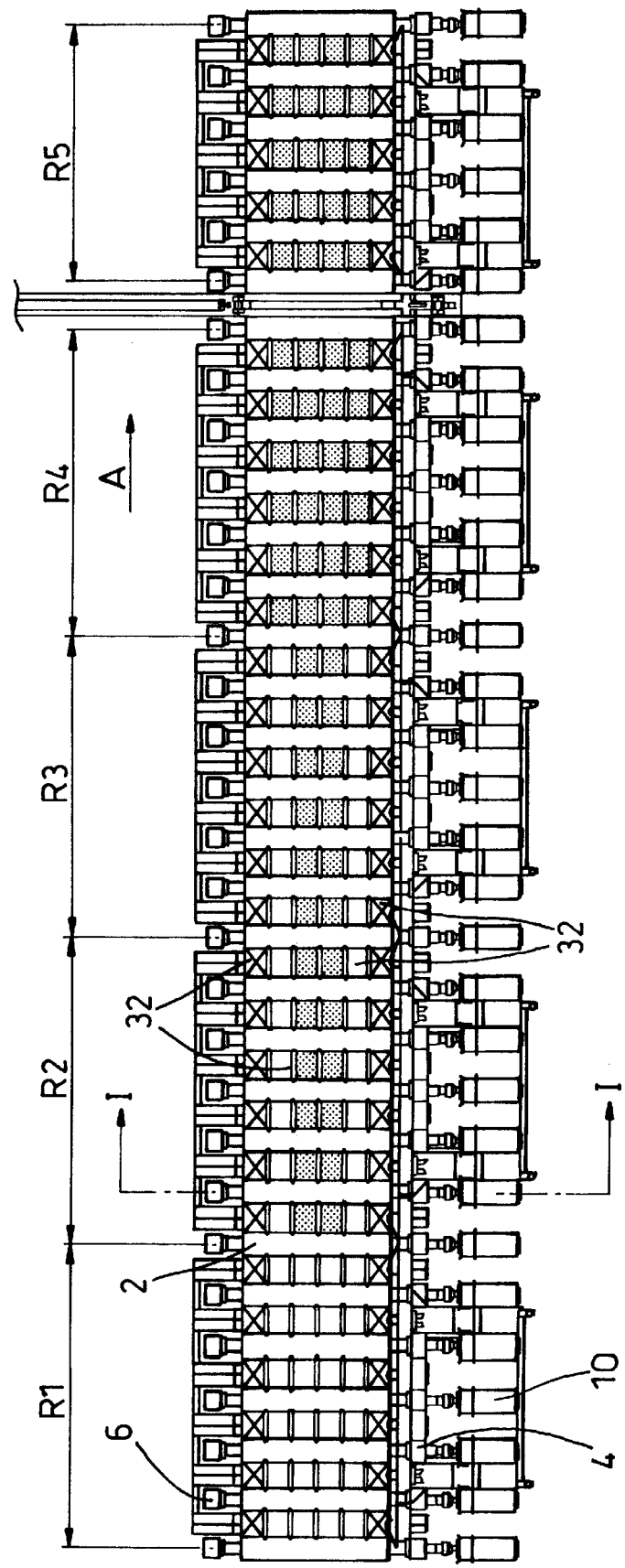
FIG. 2 is a top plan view of part of the length of the roller table in FIG. 1 with the upper heat-insulating panels and their supporting structure removed.

FIG. 2 illustrates some possible configurations for control of the lateral cooling of a slab or strip (not shown) using groups of six lower panels between adjacent rollers having the exemplified displacement drive arrangement. In the figure, the tilted lower panels are indicated differently from the horizontally oriented tiltable panels which are shown with blank faces. The crosses marked on the outer panels of each row indicate that they are fixed in position. It will be seen that the arrangement is particularly suited to maintaining insulation at the edges of the hot material while allowing heat loss from the central region. Depending upon the effect required, only the two central panels can be lowered, or all four movable panels can be lowered. (FIG. 1 also shows the two central panels tilted and indicated by the reference 32'). For closer control it is of course possible to make up each row from a greater number of panels and they need not all be the same width. It will be understood also that the typical roller table will be considerably longer, with many more rollers, so providing opportunities for further graduation of the heat insulating effect.

In the example shown in FIG. 2, all the lower panels are in their operative positions at the entry end of the roller table. Further along the roller table the two central panels of each row are lowered to allow heat to dissipate from the centre of the material width, and nearing the exit end where the material will be travelling more slowly as it enters the next roll stand (not shown) more panels of each row are lowered to increase the heat dissipation while the edges of the material remain at least partly shielded.

In the illustrated arrangement, to simplify the control system, series of groups of lower panels at successive regions of the roller table are displaced jointly. FIG. 2 shows five successive regions R1–R5, not necessarily of equal lengths, in which in the example just given, all the panels of the first region R1 are held in their operative positions, in the regions R2 and R3 the two centre panels of each group of panels are lowered, and in the regions R4 and R5 the four inner panels of each group of panels are lowered.

Figure 5:
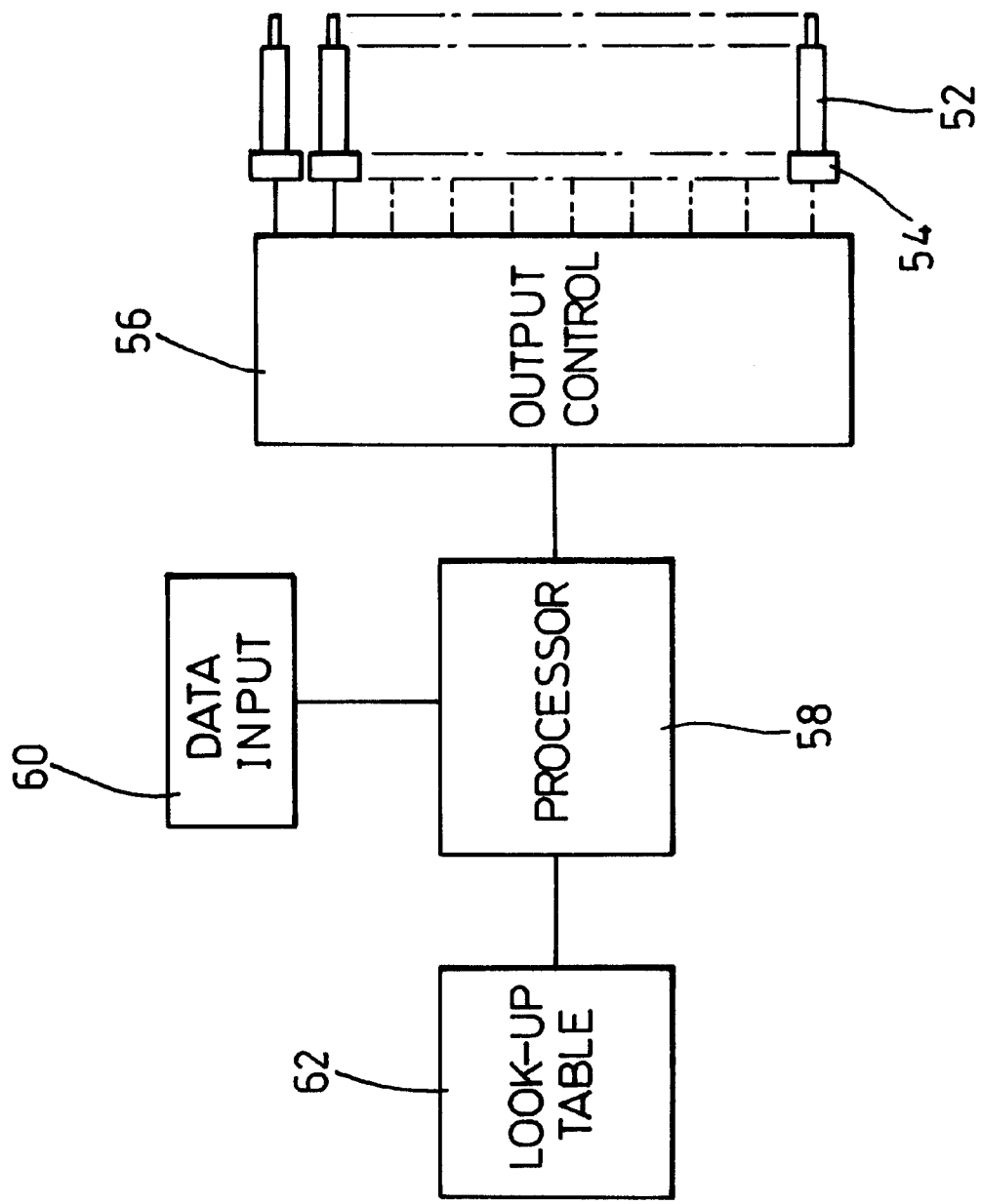
FIG. 5 is a block diagram illustrating one control system for the raising and lowering of the lower panels.

For adjusting the lower panels in the manner described, it is possible to set their positions from a computer model that predicts the effect of the tilting of the panels and so dispense with the need for active control means in order to further simplify the apparatus. An example of the means for operating in this manner is shown in FIG. 5. This shows the rams 52 for displacing the panels 32 each with an actuator 54 which is controlled by an output control unit 56 receiving its input from processor 58. The characteristics, eg. slab size and initial temperature, of the material to be carried along the roller table can be input to the processor by the operator through the data input unit 60. A look-up table 62 holds previously calculated data of control settings required for particular operations and the processor can therefore generate control values to determine the actuator settings by comparison of the data input with the look-up table data.

In an alternative control arrangement, temperature sensing elements 70 can be located at intervals across the material path, eg. between adjacent upper heat insulating panels as indicated in FIG. 1, to provide signals that actuate the displacements of the lower panels. It will be understood that it is also possible to pivot the upper panels away from the material path on their cantilever arms if additional cooling of the material is required, although this will not assist control of the edge cooling of a transfer bar.

In each case, auxiliary edge heaters (not shown) can be included to provide a supplementary means of controlling the lateral temperature profile of the hot material.

We claim:

1. A roller table for a metal hot rolling mill, comprising a series of parallel rollers providing a travel path for hot material to travel along the table between entry and exit ends of the table, a heat shield comprising series of upper and lower heat-insulating panels respectively above and below the material travel path, said travel path having a length over at least a part of which the lower panels are arranged in groups between successive rollers of the roller table, upper faces of the panels being arranged to be directed substantially parallel to said path in an operative position for limiting the radiation of heat from the hot material on said path, a plurality of said panels being disposed side by side in each said group to span a width of the table transverse to said travel path length, displacement means connected to at least some of the panels of a plurality of said groups for pivoting said panels to tilt the upper faces of the panels relative to the material path, and means for displacing said panels of each of said plurality of groups selectively to vary the heat-insulating effect of the heat shield across the width of the roller table.

2. A roller table according to claim 1 wherein support means for the displaceable panels are located below said panels and said panels are arranged to shield said support means when the panel upper faces are in their tilted positions as well as in their positions substantially parallel to the hot material travel path.

3. A roller table according to claim 1 comprising programming means for predetermining said selective displacement of the lower panels in dependence upon the characteristics of the hot material to be directed along said travel path.

4. A roller table according to claim 1 further comprising temperature sensing elements at spaced locations across the width of the roller table for controlling said selective displacement of the lower panels.

5. A roller table according to claim 1 wherein the panels of at least some of said groups of lower panels form at least first and second sub-groups, the first sub-group being located laterally within the second sub-group, the panels of at least one of said first and second sub-groups being displaceable jointly and being movable relative to at least one other said sub-group.

6. A roller table according to claim 1 wherein support means for the upper panels are upwardly pivotable to swing the upper panels clear of the roller table and the upper panels are substantially fixed in position to said support means.

7. A roller table according to claim 5 wherein the panels forming an outer sub-group at the laterally outer margins of the roller table are fixed in position.

8. A roller table according to claim 5 wherein at least one downstream group of lower panels, further along the travel direction than at least one upstream group of said panels, comprises displaceable panels that extend over a greater part of the width of the roller table than the displaceable panels of said upstream group of panels.

9. A roller table according to claim 8 wherein at least one group of lower panels at the entry end of the table is fixed in position.

10. A roller table according to claim 8 wherein the lower panels of a group of said panels at the exit end of the table are displaceable over at least a major part of the width of the roller table.

11. A method of transferring hot material on a roller table of a hot rolling mill, said table comprising a series of parallel rollers and a hot material travel path extending over the rollers between entry and exit ends of the table, lower heat-insulating panels being mounted between rollers of the table below the travel path along the table for the hot material and having upper faces for direction towards the hot material to limit the radiation of heat from said material, said method comprising the steps of arranging said lower panels side by side in rows between each adjacent pair of rollers, at least some of the panels lying in a laterally inner region of at least some of the rows of panels and selectively tilting said panels to allow a increased escape of heat from a central portion of the hot material upwardly of its side edges, whereby at least some of the panels lying in a laterally inner region of at least some of the rows of panels.

12. A method according to claim 11 further comprising tilting said panels by actuating a predetermined program in dependence upon the size and temperature of the hot material traveling along said path.

13. A method according to claim 11 further comprising sensing the temperature of the hot material on said path at different locations across the width of said roller table and tilting said panels in dependence upon the sensed temperatures.

14. A method according to claim 11 further comprising tilting a greater proportion of said panels in a plurality of said groups in a downstream region of said roller table than in a plurality of said groups of panels in an upstream region of said table.

15. A method according to claim 14 further comprising fixing the panels of at least one of said group at the entry end of the table.

16. A method according to claim 14 further comprising tilting, at the exit end of the table, panels occupying a major part of the width of the roller table to allow increased escape of heat from a central portion of the hot material.

17. A method according to claim 11 further comprising controlling the lateral temperature profile of the hot material by displacement of the panels below the travel path and locating along the table above the hot material travel path an upper series of heat shield panels to shield the travel path from above, and mounting said upper series of panels in essentially fixed positions during the control of the lateral temperature profile of the hot material by displacement of the panels below the travel path.

18. A roller table for a metal hot rolling mill, comprising:

a series of parallel rollers providing a travel path for hot material to travel along the table between entry and exit ends of the table;

a heat shield comprising series of upper and lower heat-insulating panels respectively above and below the material travel path;

said travel path having a length over at least a part of which the lower panels are arranged in groups between successive rollers of the roller table;

upper faces of the panels being arranged to be directed substantially parallel to said path in an operative position for limiting the radiation of heat from the hot material on said path;

a plurality of said panels being disposed side by side in each said group to span a width of the table transverse to said travel path length;

displacement means connected to at least some of the panels of a plurality of said groups for pivoting said panels to tilt the upper faces of the panels relative to the material path;

and means for displacing said panels of each of said plurality of groups selectively to vary the heat-insulating effect of the heat shield across the width of the roller table, and support means for the displaceable panels located below said panels, said panels being arranged to shield said support means when the panel upper faces are in their tilted positions as well as in their positions substantially parallel to the hot material travel path.

19. A roller table for a metal hot rolling mill, comprising:

a series of parallel rollers providing a travel path for hot material to travel along the table between entry and exit ends of the table;

a heat shield comprising series of upper and lower heat-insulating panels respectively above and below the material travel path;

said travel path having a length over at least a part of which the lower panels are arranged in groups between successive rollers of the roller table;

upper faces of the panels being arranged to be directed substantially parallel to said path in an operative position for limiting the radiation of heat from the hot material on said path;

a plurality of said panels being disposed side by side in each said group to span a width of the table transverse to said travel path length;

the panels of at least some of said groups forming at least first and second sub-groups, the first sub-group being located laterally within the second sub-group;

displacement means connected to at least some of the panels of a plurality of said groups and including the panels of at least one of said sub-groups for pivoting said panels to tilt the upper faces of the panels relative to the material path;

and means for operating said displacement means to displace said panels of each of said plurality of groups selectively to vary the heat-insulating effect of the heat shield across the width of the roller table;

the panels of said at least one of said first and second sub-groups being displaceable jointly and being movable relative to at least one other said sub-group.

20. A roller table for a metal hot rolling mill, comprising:

a series of parallel rollers providing a travel path for hot material to travel along the table between entry and exit ends of the table;

a heat shield comprising series of upper and lower heat-insulating panels respectively above and below the material travel path;

said travel path having a length over at least a part of which the lower panels are arranged in groups between successive rollers of the roller table;

upper faces of the panels being arranged to be directed substantially parallel to said path in an operative position for limiting the radiation of heat from the hot material on said path;

a plurality of said panels being disposed side by side in each said group to span a width of the table transverse to said travel path length;

the panels of at least some of said groups of lower panels forming a plurality of sub-groups comprising one or more sub-groups located laterally within an outer sub-group at the laterally outer margins of the roller table, each said outer sub-group being fixed in position;

displacement means connected to said sub-groups of panels within said outer sub-groups of a plurality of said groups for pivoting said panels to tilt the upper faces of the panels relative to the material path;

and means for displacing said panels of each of said plurality of groups selectively, said displaceable sub-groups of at least one downstream group of the groups of panels, further along the travel direction than at least one upstream group of the groups of panels, extend over a greater part of the width on the roller table than the displaceable sub-groups of said upstream group of panels;

whereby the heat-insulating effect of the heat shield is varied across the width of the roller table and longitudinally of the roller table.

* * * * *